United States Patent
Jensen

(10) Patent No.: US 8,725,438 B2
(45) Date of Patent: May 13, 2014

(54) LINEAR ACTUATOR

(75) Inventor: Svend Erik Knudsen Jensen, Sønderborg (DK)

(73) Assignee: Linak A/S, Nordborg (DK)

(*) Notice: Subject to any disclaimer, the term of this patent is extended or adjusted under 35 U.S.C. 154(b) by 318 days.

(21) Appl. No.: 11/663,734

(22) PCT Filed: Sep. 28, 2005

(86) PCT No.: PCT/DK2005/000615
§ 371 (c)(1),
(2), (4) Date: Jul. 8, 2008

(87) PCT Pub. No.: WO2006/034712
PCT Pub. Date: Apr. 6, 2006

(65) Prior Publication Data
US 2009/0151489 A1    Jun. 18, 2009

(30) Foreign Application Priority Data
Sep. 30, 2004   (DK) .................. PA 2004 01493

(51) Int. Cl.
*F16H 25/20* (2006.01)
*F16H 25/24* (2006.01)

(52) U.S. Cl.
CPC ............ *F16H 25/20* (2013.01); *F16H 25/2472* (2013.01); *F16H 2025/2084* (2013.01)
USPC .................. 702/60; 702/32; 702/33; 702/34; 702/35; 702/61; 702/62; 702/63; 702/188; 310/20; 310/80; 74/89.45; 74/89.35; 74/25; 74/425; 74/89.33; 74/89.38; 318/627; 318/34; 318/468

(58) Field of Classification Search
CPC ............... F16H 25/20; F16H 25/2472; F16H 2025/2084
USPC .......... 702/32–36, 60–63, 188; 310/317, 311, 310/12, 20, 80; 74/424.93, 89.45, 403, 411, 74/89.35, 25, 425, 89.33, 89.23, 89.38; 303/116.2; 318/627, 34, 468
See application file for complete search history.

(56) References Cited

U.S. PATENT DOCUMENTS

| | | |
|---|---|---|
| 3,407,318 A | 10/1968 | Korthaus et al. |
| 4,707,796 A | 11/1987 | Calabro et al. |
| 4,920,811 A | 5/1990 | Hopper |
| 5,075,911 A | 12/1991 | Dewert |
| 5,205,004 A | 4/1993 | Hayes et al. |
| 5,449,869 A * | 9/1995 | Tinkham ............... 200/302.1 |
| 5,726,911 A * | 3/1998 | Canada et al. .............. 702/32 |
| 5,918,505 A | 7/1999 | Jensen |
| 6,158,295 A | 12/2000 | Nielsen |
| 6,476,570 B1 * | 11/2002 | Pasini et al. .............. 318/34 |
| 6,490,543 B1 | 12/2002 | Jaw |
| 7,511,442 B2 | 3/2009 | Jehle et al. |

(Continued)

Primary Examiner — Carol S Tsai
(74) Attorney, Agent, or Firm — Dykema Gossett PLLC

(57) ABSTRACT

A linear actuator comprises a reversible electric motor (2) which, via a transmission, is capable of driving a spindle (4) having a spindle nut (5) secured against rotation and comprises a power supply and a controller. The actuator moreover comprises a memory unit for collecting at least one set of data from the operation, indicating how long and how hard the actuator has worked. It is hereby possible to obtain an overview of the mechanical state of the actuator and thereby prevent unfortunate occurrences and accidents as a consequence of wear-out of the actuator.

32 Claims, 2 Drawing Sheets

(56) References Cited

U.S. PATENT DOCUMENTS

| | | | |
|---|---|---|---|
| 2001/0054533 A1* | 12/2001 | Bushey et al. | 192/84.1 |
| 2002/0066325 A1* | 6/2002 | Roither et al. | 74/89.23 |
| 2004/0051256 A1* | 3/2004 | Ayrton | 279/4.01 |
| 2004/0231480 A1* | 11/2004 | Wattles et al. | 83/401 |
| 2005/0029476 A1* | 2/2005 | Biester et al. | 251/58 |
| 2005/0172405 A1* | 8/2005 | Menkedick et al. | 5/618 |
| 2006/0244406 A1 | 11/2006 | Jehle et al. | |

* cited by examiner

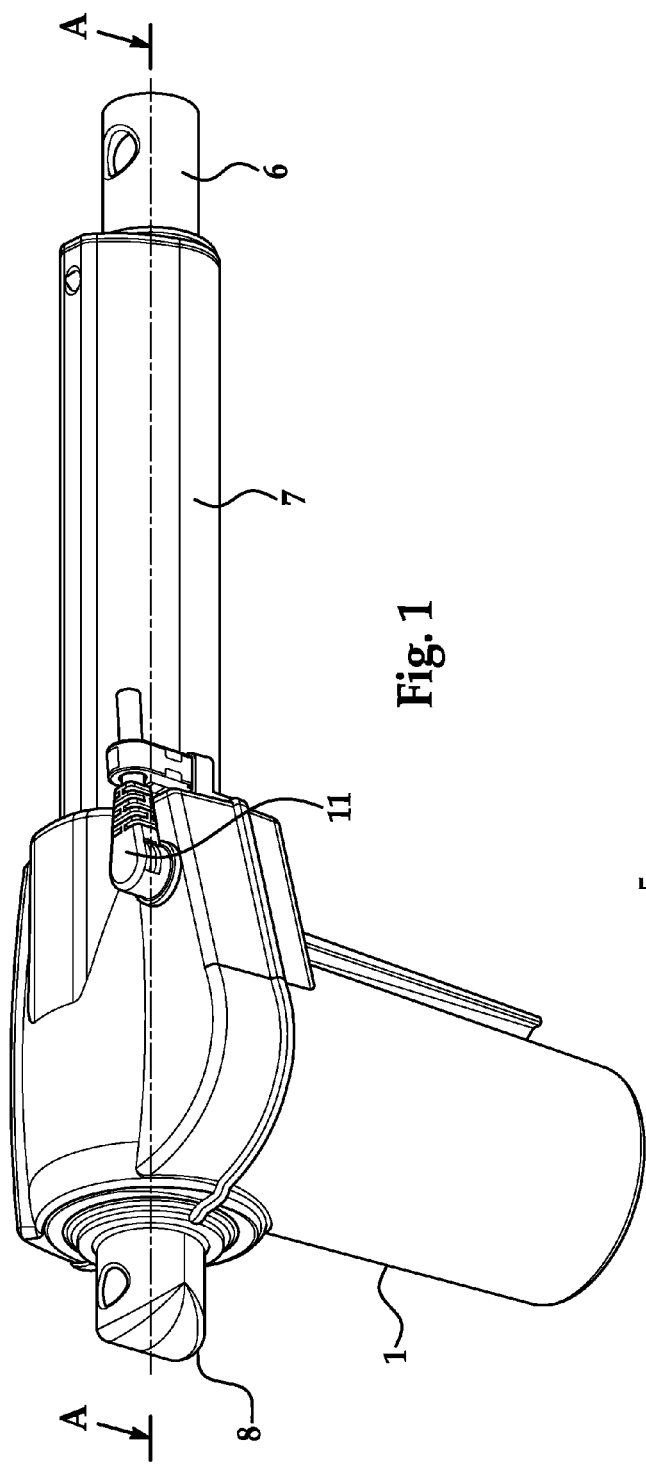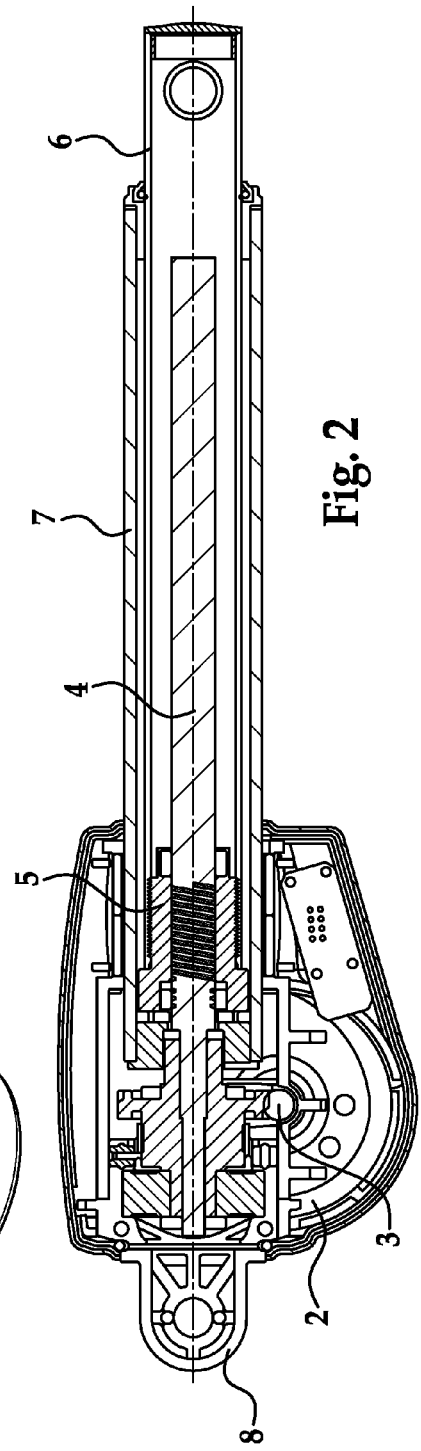

LINEAR ACTUATOR

BACKGROUND OF THE INVENTION

1. Field of the Invention

The present invention relates to a linear actuator of the type which is based on a spindle.

2. The Prior Art

Actuators of this type are generally known and used. By way of example, reference may be made to WO 98/30816 A1 to Linak A/S, which relates to an actuator with an activation rod guided in an outer tube, and DK 174 457 B1 to Linak A/S, in which the spindle nut is intended for direct attachment to the application. An example of an application is found, e.g., in EP 488 552 A1 to Huntleigh Technology plc, which relates to a hospital bed with several actuators coupled to a common control box containing a power supply and a control. A special embodiment of actuators for domestic beds with two spindles, an integrated power supply and control is known from EP 372 032 B2 to Dewert Antriebs- and Systemtechnik GmbH & Co. KG.

A spindle with an associated spindle nut is a central element of these actuators. In case of spindles of a non-self-locking type, they are provided with a brake, or, alternatively, a transmission with a low efficiency is selected, so that the transmission is self-locking. A perfect operation of these elements is critical to the operation of the actuator. A typical transmission is a worm gear which is of plastics owing to noise, but on the other hand it is more exposed to wear than a worm gear of metal. In order to stop the activation rod of the actuator, the actuator is provided with end stops. It may be end stop switches which are activated by the spindle nut or an outer pipe. Another form of end stops is a mechanical stop for the spindle nut. Still another form of end stops is based on optical or magnetic encoders which count the revolutions of the spindle. When the nut engages the mechanical stop, the motor current is increased considerably and is interrupted by the control electronics. Again, a safe function of these elements is conditional upon a perfect function of the spindle and the spindle nut. Indirect damage may also occur because of wear of the seal between the activation rod and the outer end of the surrounding protective tube. Penetrating dust and moisture also act to wear out the spindle and the spindle nut, just as end stops and other components are likewise exposed to wear-out and malfunction.

To prevent damage to individuals and equipment, the actuators may be equipped with various safety measures, such as safety nut, spline function, electrical overload protection, etc.

An example of a safety-critical application is a patient lifter which acts like a crane and can lift patients out of beds, chairs, etc. In such an application, it is critical that the actuator does not fail suddenly.

The manufacturers of actuators guarantee a certain service life against compliance with mounting specifications and service instructions. However, it has been found that the actuators are used far beyond the guaranteed service life, where the risk of failure is the greater the longer they are used. Nor is it unusual that the actuators are used for greater loads than the pre-scribed maximum load, or in an environment for which they are not intended.

In the event of an unfortunate occurrence or direct accidents, it may be difficult to elucidate the concrete conditions of the actuator which have caused the event. All that one has to go by is various marks which make it possible to recover the product specifications and the production time at the manufacturer's. First and foremost, it is a matter of avoiding unfortunate occurrences and accidents, but to achieve this it is decisive that the manufacturers get an adequate basis for improving the quality and the safety of the actuators. In the second place, allocation of responsibility is also involved, which, in turn, influences the insurance conditions and contracts.

In this connection it is observed that the cost level plays a decisive role. If the selling price is too high, it is seen that safety measures having no immediate effect are not adopted. It is noted that for cost reasons the actuators are constructed such that they can momentarily accept a certain overload, a constraint in the form of an intermittence, typically 10%, being simultaneously imposed, which means that an actuator may only run for 6 minutes out of an hour.

The object of the invention is to provide an actuator where a more adequate basis for evaluating the state of the actuator may be obtained.

SUMMARY OF THE INVENTION

This is achieved according to the invention in that the actuator is equipped with a memory unit for collecting at least one set of data from the operation, indicating how long and how hard the actuator has worked.

The information, which is saved/collected, may be collected by a microprocessor likewise disposed in the actuator and be saved in the internal memory, if so desired. Alternatively, a microprocessor may be disposed in a controller elsewhere in the system, e.g., in a control box arranged externally relative to the actuator, and collect and save this information in the actuator via a form of bus. It is ensured hereby that the information follows the actuator in case of replacement, rebuilding, etc. Further, a form of physical memory is conceivable, where the user "draws on" the memory on the basis of, e.g., the consumption of power and elapse of time.

The invention is contemplated for use together with a collection of a plurality of parameters, which might, e.g., be, but are not necessarily restricted to, power, time, temperature, load, voltage and speed. A message to the user to the effect that the product is approaching wear-out may take place in that the actuator, on its own, provides information in the form of visual or acoustic signals, lacking functionality and the like, but may alternatively also be done by a form of service reading which may be made in periodic intervals by service staff, or more regularly by a connected controller which itself contains a form of signaller.

It is important to note that it is not necessarily possible beforehand to set up the criteria of the wear-out level. It is conceivable that just a collection of data takes place, and that the evaluation of these data then takes place at a later time. This will typically be the case at the start of a production of an entirely new application. It is conceivable that, then, the wear-out criteria will be available only after the product has been on the market for some time.

Embodiments of the invention will be described more fully below with reference to the accompanying drawings.

BRIEF DESCRIPTION OF THE DRAWINGS

FIG. 1 shows a perspective view of the actuator,

FIG. 2 shows a longitudinal section through the actuator along the line A-A,

DETAILED DESCRIPTION OF THE PREFERRED EMBODIMENT

Figure 3:
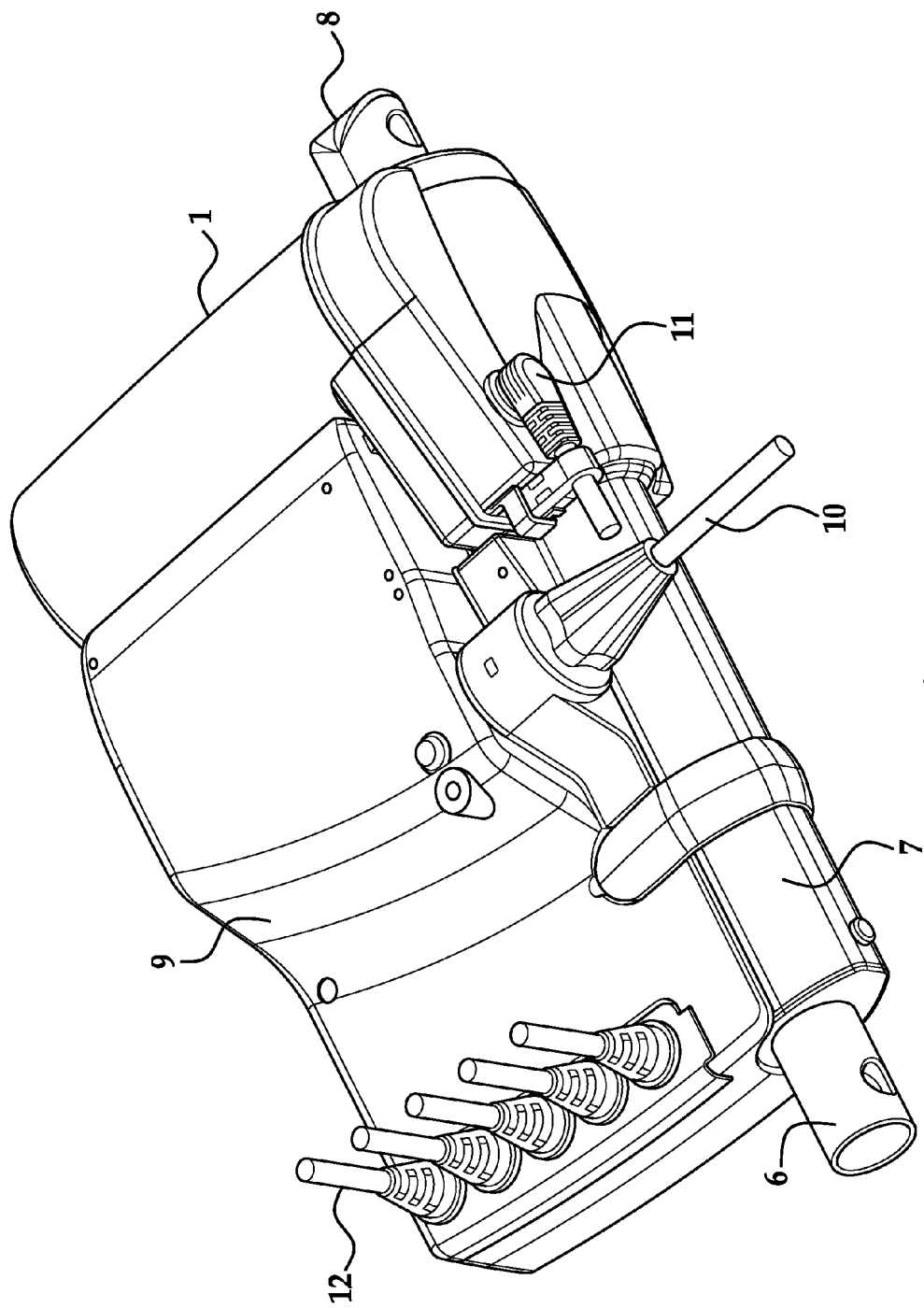
FIG. 3 shows a perspective view of the actuator provided with a control box.

As will appear from FIGS. 1 and 2, the main components of the actuator are a cabinet 1, a motor 2 mounted in the cabinet, a worm gear 3 in the cabinet, a spindle 4 mounted in the cabinet, a spindle nut mounted on the spindle and secured against rotation, an activation rod 6, an outer pipe 7 and a rear attachment 8. The motor is a reversible electric motor, typically a 24V or 48V DC motor.

As will appear from FIGS. 1 and 2, the main components of the actuator are a cabinet 1, a motor 2, a worm gear (transmission) 3, a spindle 4, a spindle nut 5, an activation rod 6, an outer pipe 7 and a rear attachment 8. The motor is a reversible electric motor, typically a 24V or 48V DC motor.

As will appear from FIG. 3, the actuator may be equipped with a control box 9 containing control electronics as well as a power supply, where 10 designates the mains cable. The cable 11 from the actuator is connected with one of the outputs 12 of the control box, but further actuators as well as hand controls for the other outputs may be connected.

A memory unit is arranged in the actuator for the collection of data from the operation, indicating how long and how hard the actuator has worked. These data are collected by a microprocessor disposed in the control box.

To evaluate the state of the actuator, it is possible to use the power as a parameter, which may be measured in a simple manner across a serial resistor in the power path to the motor. The size of the power is an indication of how severely the actuator is loaded. Another important parameter is the period of time during which the power has been switched on, which may be obtained directly from the microprocessor.

Another important parameter is the temperature, which is obtained from a temperature sensor arranged in the actuator or in another manner. It may hereby be recorded whether the actuator has been exposed to steep increases in temperature, e.g. as a consequence of abnormally severe loading.

An alternative or supplement to the foregoing is the provision of strain gauges for measuring the load. These may, e.g., be arranged in connection with the spindle bearing.

A further alternative is to sum up the revolutions of the spindle, which may be carried out by a mechanical counter, optical or magnetic encoders, scanning of the commutator pulses of the motor. In special applications, the actuator may be provided with a linear slide potentiometer positioned in parallel with the spindle, and also the signal from this may be used as a parameter for the evaluation of the state of the actuator.

To signal wear-out of the actuator, this and/or the control box may be equipped with light emitting diodes, which signal wear-out or optionally the degree of wear-out by means of a colour code. More expediently, however, the signal generator is arranged in the hand control, where it is directly visible.

The invention thus provides a linear actuator where it is possible to make an evaluation of the instantaneous mechanical state of the actuator on the basis of at least one set of data from the operation, indicating how long and how hard the actuator has worked (power used). In the first instance, the invention is contemplated for actuators fresh from the factory, but may also be implemented in connection with already existing actuators, of course, typically in connection with an overall service of a group of applications, e.g., all the patient lifters of a nursing home. It might, e.g., be incorporated in the rear attachment, which is typically replaceable and moreover extends into the cabinet.

The invention claimed is:

1. A linear actuator which comprises:
    a cabinet,
    a spindle mounted in the cabinet which includes a spindle nut secured against rotation,
    an activation rod having an end connected to the spindle nut,
    a reversible DC motor mounted in the cabinet,
    a worm gear for operatively connecting the reversible DC motor with the spindle,
    a power supply having a DC output for the DC motor,
    a controller, and
    a memory unit for collecting at least one set of data from operation of the linear actuator which indicates a time period the linear actuator has operated and power used during said time period, said memory unit being configured for communication with a means for evaluating a mechanical state of said linear actuator based on at least said one set of data stored in said memory unit.

2. The actuator according to claim 1, including a microprocessor for collecting the data.

3. The actuator according to claim 2, wherein the microprocessor is located externally of the actuator and collects and saves said data in the memory unit of the actuator via a form of bus.

4. The actuator according to claim 1, wherein power is used for evaluating the state of the actuator by measuring it across a serial resistor in a power path to the motor.

5. The actuator according to claim 2, wherein a period of time during which the power has been switched on is obtained directly from the microprocessor.

6. The actuator according to claim 1, including a temperature sensor for measuring and collecting temperature data.

7. The actuator according to claim 1, including strain gauges for measuring and collecting load data.

8. The actuator according to claim 7, wherein the strain gauges are arranged in connection with a spindle bearing.

9. The actuator according to claim 1, wherein the revolutions of the spindle are measured and summed up by means of a mechanical counter or optical or magnetic encoders or scanning of the commutator pulses of the motor.

10. The actuator according to claim 1, including a linear slide potentiometer disposed in parallel with the spindle, a signal from the linear slide potentiometer being used as a parameter for evaluation of a state of the actuator.

11. The actuator according to claim 1, wherein the actuator and/or a control box is equipped with light-emitting diodes to signal wear-out of the actuator.

12. The actuator according to claim 11, wherein a color code signals wear-out or optionally the degree of wear-out.

13. The actuator according to claim 11, wherein a signal generator is arranged in a hand control where it is directly visible.

14. The actuator according to claim 1, incorporated in a mounting bracket of the actuator.

15. The linear actuator of claim 1 wherein the operation of the linear actuator comprises intermittent operation in accordance with a user command inputted through a hand control electrically coupled to the controller.

16. A lifter mechanism for lifting a patient from a hospital bed, said lifter mechanism comprising:
    a linear actuator electrically coupled to a hand control for control of the lifter mechanism by a user through selective operation of the linear actuator,
    the linear actuator includes:
        a cabinet,
        a spindle mounted in the cabinet which includes a spindle nut secured against rotation,
        an activation rod having an end connected to the spindle nut,
        a reversible DC motor mounted in the cabinet,
        a worm gear for operatively connecting the reversible DC motor with the spindle,
        a power supply having a DC output for the DC motor, a controller, and a memory unit for collecting at least one set of data from operation of the linear actuator which indicates a time period the linear actuator has operated and power used during said time period, said memory unit being configured for communication with a means for evaluating a mechanical state of the linear actuator based on at least the one set of data stored in the memory unit.

17. A linear actuator which comprises:

a cabinet, a spindle mounted in the cabinet which includes a spindle nut secured against rotation, an activation rod having an end connected to the spindle nut, a reversible DC motor mounted in the cabinet, a worm gear for operatively connecting the reversible DC motor with the spindle, a power supply having a DC output for the DC motor, a controller configured to control the operation of the linear actuator in response to a user command given by a user using a hand control coupled to the controller, and a memory unit for collecting at least one set of data when the linear actuator is operated by the controller, the at least one set of data indicating at least a time period the linear actuator has operated and the power used during said time period, said memory unit being configured for communication with a means for evaluating a mechanical state of said linear actuator based on at least said one set of data stored in said memory unit.

18. The linear actuator of claim 17 wherein the operation of the linear actuator comprises intermittent operation in accordance with the user command to the controller.

19. A linear actuator which comprises:

a cabinet, a spindle mounted in the cabinet which includes a spindle nut secured against rotation, an activation rod having an end connected to the spindle nut, a reversible DC motor mounted in the cabinet, a transmission for operatively connecting the reversible DC motor with the spindle, a power supply having a DC output for the DC motor, a controller, and a memory unit for collecting at least one set of data from operation of the linear actuator which indicates a time period the linear actuator has operated and power used during said time period, said memory unit being configured for communication with a means for evaluating a mechanical state of said linear actuator based on at least said one set of data stored in said memory unit.

20. The actuator according to claim 19, including a microprocessor for collecting the data.

21. The actuator according to claim 20, wherein the microprocessor is located externally of the actuator and collects and saves said data in the memory unit of the actuator via a form of bus.

22. The actuator according to claim 19, wherein power is used for evaluating the state of the actuator by measuring it across a serial resistor in a power path to the motor.

23. The actuator according to claim 19, wherein a period of time during which the power has been switched on is obtained directly from the microprocessor.

24. The actuator according to claim 19, including a temperature sensor for measuring and collecting temperature data.

25. The actuator according to claim 19, including strain gauges for measuring and collecting load data.

26. The actuator according to claim 25, wherein the strain gauges are arranged in connection with a spindle bearing.

27. The actuator according to claim 19, wherein the revolutions of the spindle are measured and summed up by means of a mechanical counter or optical or magnetic encoders or scanning of the commutator pulses of the motor.

28. The actuator according to claim 19, including a linear slide potentiometer disposed in parallel with the spindle, a signal from the linear slide potentiometer being used as a parameter for evaluation of a state of the actuator.

29. The actuator according to claim 19, wherein the actuator and/or a control box is equipped with light-emitting diodes to signal wear-out of the actuator.

30. The actuator according to claim 29, wherein a color code signals wear-out or optionally the degree of wear-out.

31. The actuator according to claim 29, wherein a signal generator is arranged in a hand control where it is directly visible.

32. The actuator according to claim 19, incorporated in a mounting bracket of the actuator.

* * * * *

UNITED STATES PATENT AND TRADEMARK OFFICE
CERTIFICATE OF CORRECTION

| | |
|---|---|
| PATENT NO. | : 8,725,438 B2 |
| APPLICATION NO. | : 11/663734 |
| DATED | : May 13, 2014 |
| INVENTOR(S) | : Jensen |

It is certified that error appears in the above-identified patent and that said Letters Patent is hereby corrected as shown below:

In the Claims

Claim 23, Column 6, line 15, delete "claim 19" and insert --claim 20--.

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,725,438 B2                                                                Page 1 of 1
APPLICATION NO.    : 11/663734
DATED              : May 13, 2014
INVENTOR(S)        : Svend Erik Knudsen Jensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Twenty-ninth Day of September, 2015

Michelle K. Lee
*Director of the United States Patent and Trademark Office*